Figure 1:
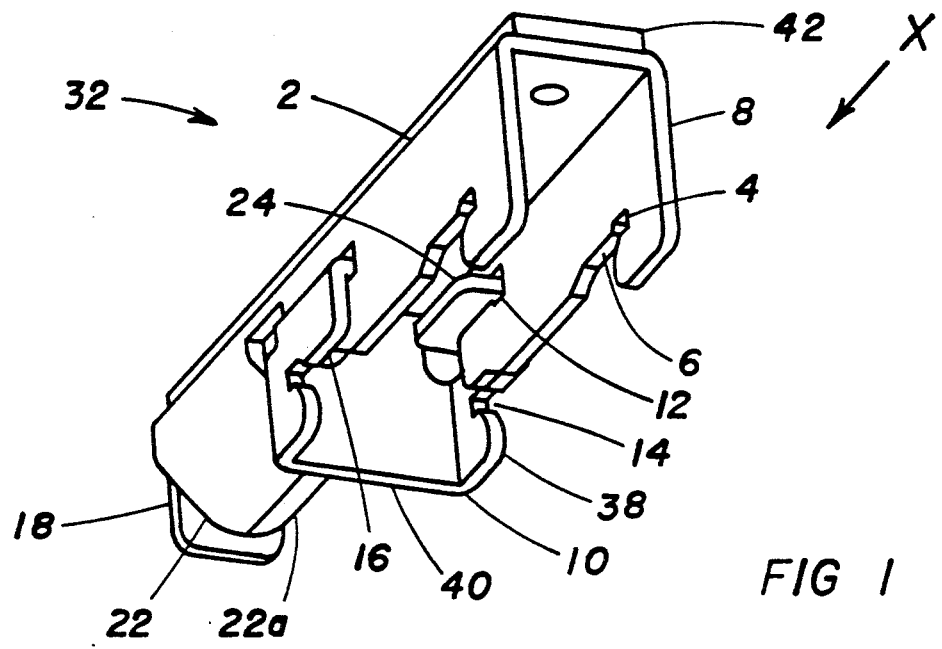

United States Patent [19]

Huber

[11] Patent Number: 5,135,415
[45] Date of Patent: Aug. 4, 1992

[54] DEVICE FOR ATTACHING ELECTRICAL COMPONENTS TO TRACK

[76] Inventor: Nick Huber, 102 Tower Circle Dr., Jackson, Mo. 63755

[21] Appl. No.: 743,826

[22] Filed: Aug. 12, 1991

[51] Int. Cl.$^5$ .............................................. H01R 9/26
[52] U.S. Cl. .................................. 439/716; 439/347
[58] Field of Search ................ 439/532, 716, 717, 718

[56] References Cited

U.S. PATENT DOCUMENTS

| | | | |
|---|---|---|---|
| 2,011,861 | 8/1935 | Knümann | 439/716 |
| 4,018,413 | 4/1977 | Bauer | 439/716 |
| 4,268,108 | 5/1981 | DeBaight | 439/716 |
| 4,454,382 | 6/1984 | Borne et al. | 439/347 |

Primary Examiner—Larry I. Schwartz
Assistant Examiner—Hien D. Vu

[57] ABSTRACT

A device for attaching components to structures such as DIN track in an electrical panel. Attached to a component with standard fasteners or an adhesive strip is the channel shaped body. Near one end, the channel legs are notched to receive one edge of the track. At the opposite end are tabs for retaining a compression spring. Near the middle of the channel legs are two slots that guide the motion of a sliding jaw. The jaw has two tabs notched to fit the opposite edge of the track. The compression spring forces the sliding jaw toward the other end of the body causing the track edges to be gripped between the opposing sets of notches.

5 Claims, 2 Drawing Sheets

DEVICE FOR ATTACHING ELECTRICAL COMPONENTS TO TRACK

BACKGROUND

1. Field of Invention

This invention relates to devices for attaching articles such as electrical, electronic, and computer components to special channels for such purpose, and specifically to a spring actuated means for quick mount and release of the assembly from the channel.

2. Description of Prior Art

In the field of manufacture of electrical controls, it is necessary to mount all manner of components and devices inside enclosures generally called panels. Means of mounting these components include using screws and other common fasteners mounted through either the component or a connected appliance. A panel surface, or an attached structure for such purpose, must be drilled, tapped, or otherwise prepared to receive such fasteners. A commonly used structure for mounting components is called DIN (Deutsche Industry Norman) track, a channel shaped extrusion.

Some prior inventions have attempted to address the need for faster and easier means to attach components to panels. U.S. Pat. No. 4,921,445 describes a steel clamp device that is attached to a component with common fasteners. The clamp then grips a track with two separate opposing members each with a "C" shaped area for gripping the edges of the track. The two parts of the clamp are forced together by a pair of integral arms on one part that flex against a tang on the companion part. Due to the structure of the arms used to pull the two parts together, the clamp device must be longer in the direction of the track edges than the dimension across or perpendicular to the track edges.

U.S. Pat. No. 4,067,529 also uses opposing hook structures to grip edges of a track and uses fin shaped structures to pull the two gripping areas together. The fins are also aligned nearly parallel to the track edges. This invention also must be longer in the direction of the track edges.

U.S. Pat. No. 4,477,047 is an example of inventions consisting of specially designed clips that attach to a component and then attach to a track. These clips will operate only in conjunction with components specifically designed to accommodate them. Use of the clips on a wide range of devices is therefore impractical.

OBJECTS AND ADVANTAGES

To overcome the above described deficiencies the objects and advantages of the present invention are:

(a) to provide means to attach an article to a mounting track without the use of tools.

(b) to provide means to also remove the article from the track without tools.

(c) to be of such dimensions to allow mounting of components that are, in the direction of the track edges, shorter than the width of the track. It should be possible to attach and remove such narrow components in contact with each other, i.e. a side by side full row on a mounting track.

DRAWING FIGURES

Figure 2:
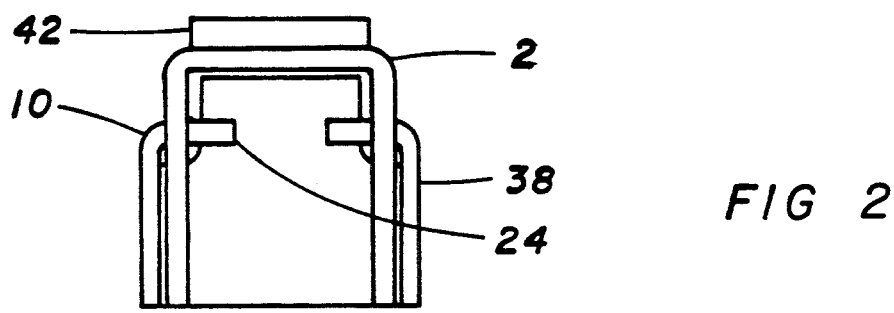
Figure 3:
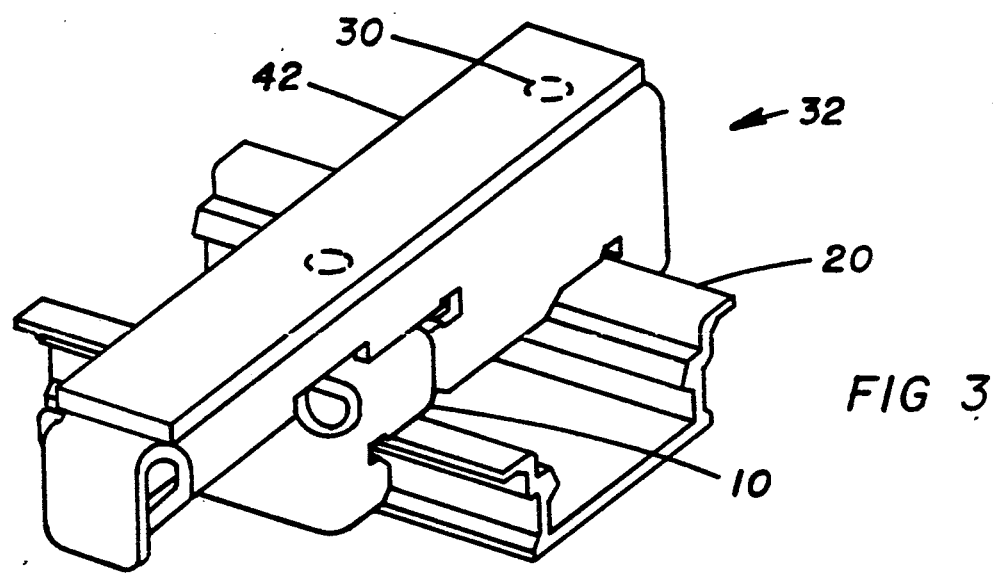
Figure 4:
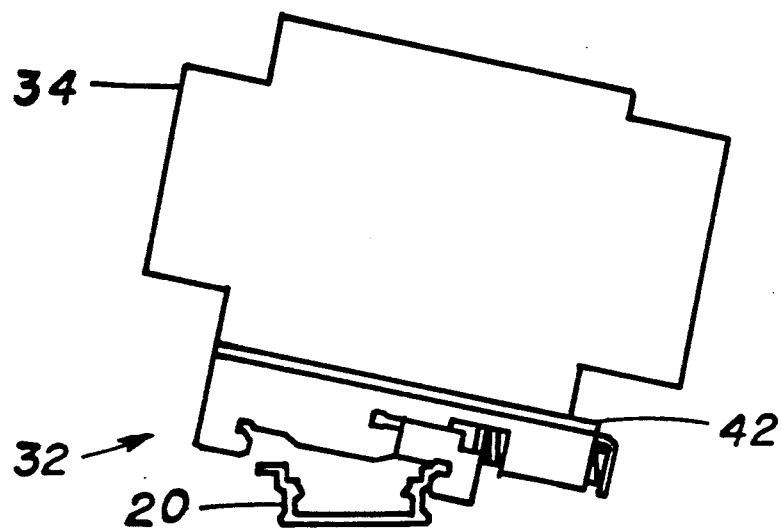
Figure 5:
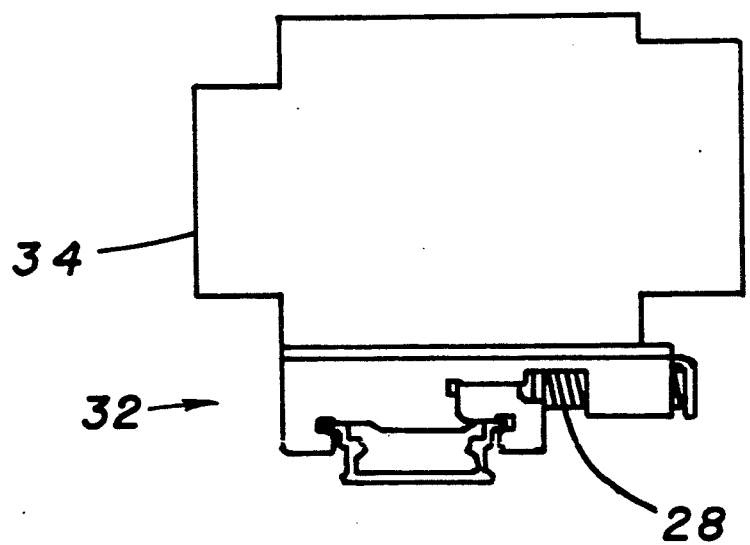

FIG. 1 shows a view of the assembled invention.
FIG. 2 shows an end view of the assembly.
FIG. 3 shows the invention attached to DIN (Deutsche Industry Norman) track.
FIG. 4 shows the invention assembled to an article ready for attachment to a track.
FIG. 5 shows the invention and article attached to a track.

DESCRIPTION—FIGS. 1 TO 5

The present invention is revealed in FIG. 1 as a complete assembly 32, comprised preferably of metal components where noted. The metal body 2 is a channel shaped member modified with a notch 4 near one end of each leg 8. Adjacent to each notch is a rest 6. A metal sliding jaw 10 engages a pair of slots 12 near the middle of the legs 8. The sliding jaw 10 consists of tangs 24 connected to two parallel tabs 38 connected by a plate 40. On each of the sliding jaw tabs 38 are opposing notches 14, mirror imaged to the notches 4 in the body 2. Adjacent to the each opposing notch 14 on the sliding jaw 10 are rest surfaces 16, similar in height to the rests 6 on the body 2. Formed from the end of the body 2 opposite the notches 4 is a stop 18 and enclosure tabs 22 and 22a. Retained in position by the tabs 22 and 22a and compressed between stop 18 and the sliding jaw 10 is a common compression spring 28, indicated only in FIG. 5. Also shown is an polymer adhesive strip 42.

The end view as designated by X in FIG. 1 is shown in FIG. 2. FIG. 2 shows two tangs 24, formed from the tabs 38 on the sliding jaw 10, that slide in the slots 12 shown in FIG. 1.

FIG. 3 shows the invention 32 in assembly position with a section of DIN (Deutsche Industry Norman) track 20. Also visible is the adhesive strip 42, covering some mounting holes 30 in the body 2. The sliding jaw 10 is shown somewhat retracted.

Shown in FIG. 4 is the invention assembly 32 attached to a component 34 with the aforementioned adhesive strip 42. The combination is shown in a position ready to be attached to a track 20, commonly referred to as DIN track.

In FIG. 5 the combination of the invention 32 and the component 34 is shown in the final attached position. The compression spring 28 is also visible.

OPERATION—FIGS. 1, 3, 4, 5

Referring to FIG. 4 the the invention is attached to a component 34 by the preferred method of a double sided adhesive strip 42. The combination of the invention 32 and the component 34 is held in the installer's hand in the position shown in FIG. 4. A force applied to the combination causes the sliding jaw 10 to be retracted, compressing spring 28 (FIG. 5). The retraction creates adequate length between the opposing notches 4 and 14 to allow the combination to be pivoted about notch 14 until rest 6 contacts the track 20. When the force compressing spring 28 is released, the sliding jaw 10 is advanced by spring 28, applying pressure to both edges of the track 20. The combination is thus secured on the track and can be removed by reversing the above described installation procedure.

SUMMARY

The present invention can be attached quickly to an article using an included adhesive strip. The combination can then be quickly installed on DIN track or similar mounting structures without tools. The combination can in similar fashion be removed from the track. The proportions of the invention make possible side by side mounting of devices of 0.75 inch width, which are commonly used in the manufacture of electrical controls.

We claim:

1. A track mountable assembly for attaching electrical components, comprising:
   a compression spring;
   a sliding jaw comprising;
      a pair of tabs each containing notches for engaging a track edge;
      a plate connecting and perpendicular to said tabs which contacts the free end of said spring;
   a body comprising;
      a top surface;
      a pair of legs perpendicular to said top surface and forming a channel shape, the length of said body being substantially greater than the width;
      a pair of notches for gripping a track edge near one end of said body, located in each of said legs;
      a plurality of formed tabs at a end opposite said notches for containment of said spring;
   said sliding jaw being slideably mounted in said body such that said spring causes a compressive force between said notches in said sliding jaw and said notches in said body, thereby exerting a gripping force on said track edges.

2. The assembly of claim 1 wherein the overall width of said assembly is substantially less than the width across said track.

3. The assembly of claim 1 wherein attached to said top surface of said body at a location opposite said notches, is an adhesive strip for attaching said assembly to various articles.

4. The assembly of claim 1 wherein the top surface of said body contains holes to be used for attachment of said body to various articles with common fasteners.

5. The assembly of claim 1 wherein said legs of said body contain slots to receive guide tangs projecting from said tabs on said sliding jaw, thereby controlling the position and motion of said sliding jaw.

* * * * *